United States Patent [19]
Allgood et al.

[11] Patent Number: 5,944,018
[45] Date of Patent: Aug. 31, 1999

[54] COMPACT AND DISPOSABLE RESCUE PACING UNIT

[75] Inventors: Fred A. Allgood, Fort Worth; Robert Sanford, Flower Mound; Gerald Stuteville, North Richland Hills; James M. Watts, Fort Worth, all of Tex.

[73] Assignee: Dexide, Inc., Fort Worth, Tex.

[21] Appl. No.: 08/954,700

[22] Filed: Oct. 20, 1997

[51] Int. Cl.⁶ .................... A62B 37/00; A61H 31/00
[52] U.S. Cl. ............................................. 128/897
[58] Field of Search .................... 600/300, 897, 600/898; 434/262, 265; 206/363, 438, 472; 40/124.09, 124.12, 124.14

[56] References Cited

U.S. PATENT DOCUMENTS

| | | |
|---|---|---|
| 4,286,399 | 9/1981 | Fumahashi et al. ............... 40/124.12 |
| 4,588,383 | 5/1986 | Parker et al. ............... 434/265 |
| 4,863,385 | 9/1989 | Pierce ............... 434/265 |
| 5,088,037 | 2/1992 | Battaglia . |
| 5,239,988 | 8/1993 | Swanson et al. . |
| 5,293,705 | 3/1994 | Wood ............... 40/124.12 |
| 5,394,892 | 3/1995 | Kenny et al. ............... 128/897 |
| 5,425,078 | 6/1995 | Stern . |
| 5,692,500 | 12/1997 | Gaston-Johansson ............... 600/300 |

*Primary Examiner*—Samuel Gilbert
*Attorney, Agent, or Firm*—Gunn, Lee & Keeling

[57] ABSTRACT

A pacing apparatus has a housing formed of laminar material less than about 1" in thickness. Visual indicia are applied to the housing and provide instructions for the administration of the rescue procedure. A pacing signal generator is carried by the housing for providing the pacing signal to a user. The pacing signal generator provides visual and/or audible indications to a user for pacing the administration of the rescue procedure. The usual indicators may be LEDs and the audible indicator may be one or more tones.

24 Claims, 2 Drawing Sheets

COMPACT AND DISPOSABLE RESCUE PACING UNIT

BACKGROUND OF THE INVENTION

1. Field of the Invention

The present invention relates generally to apparatus for assisting a user in the administration of a rescue procedure to a patient. More specifically, the present invention relates to portable and disposable apparatus for assisting in the pacing of a rescue procedure such as cardiopulmonary resuscitation (CPR).

2. Background Information

For several years, rescue procedures administered by laymen, such as the Heimlich maneuver and artificial respiration have become a fairly commonplace feature of everyday life. For example, these procedures are commonly taught to schoolchildren and to adults in swimming classes and the like. Posters depicting the steps of these procedures are common in the workplace in the event such a procedure must be administered.

These posters and similar graphic materials do an adequate job of conveying and reminding one of the steps of these procedures. Nevertheless, there is a significant component of timing to the proper administration of some of these procedures, notably CPR. Artificial respiration must be delivered at selected intervals to be effective, as must the chest compressions associated with CPR. Indeed, in many instances, CPR and artificial respiration must be administered simultaneously, further compounding the difficulty in properly timing the steps of the procedure.

Several devices are provided in the prior art that provide prompting or pacing tones, signals, or even speech to those who must administer CPR and similar rescue procedures.

U.S. Pat. No. 5,394,892 discloses a device that provides prompting and other information to a person giving CPR. The lid is opened and the operator prompted to perform artificial respiration then check the pulse of the patient. If there is no pulse, CPR is administered with pacing for respiration and compression responsive to prompting from the unit.

U.S. Pat. No. 5,329,988 discloses a CPR aid in the form of a wrist watch. The device provides audible prompting for chest compressions and respiration.

U.S. Pat. No. 5,088,037 discloses a portable rescue administration aid that provides a variety of indications for assistance in administering rescue breathing and CPR, among other rescue techniques.

U.S. Pat. No. 4,588,383 discloses a prompting device for prompting a person to carry out sequential steps of a task such as CPR. The device is portable, but not disposable.

U.S. Pat. No. 4,863,385 discloses a portable device that provides timing and sequence guidance for aiding a CPR rescuer.

One drawback to these devices is that they generally do not provide instructions in the administration of the procedure itself, but merely prompting for administration of the steps. A further drawback is that these devices, while portable in some instances, are not necessarily designed to be available at the moment they are needed. Still further, these prior-art devices are somewhat costly to manufacture and thus are not adapted to be placed in many conspicuous locations, like the near-ubiquitous posters.

A need exists, therefore, for an apparatus that delivers graphic instruction and pacing or prompting for the administration of a rescue procedure such as CPR that is sufficiently inexpensive to manufacture that it is essentially disposable.

SUMMARY OF THE INVENTION

It is a general object of the present invention to provide an improved apparatus for assisting the administration of a rescue procedure such as CPR.

This and other objects of the present invention are achieved by providing a housing formed of laminar material less than about one inch in thickness. Visual indicia are applied to the housing and provide instructions for the administration of the rescue procedure. A pacing signal generator is carried by the housing for providing the pacing signal to a user.

According to the preferred embodiment of the present invention, the laminar material is cardboard and further comprises a plurality of rectilinear panels connected along their edges to permit folding of the laminar material to a reduced dimension.

According to the preferred embodiment of the present invention, the pacing signal generator includes an audible tone generator and two flashing light-emitting diodes.

According to the preferred embodiment of the present invention, the visual indicia comprises words and graphic illustrations describing the rescue procedure.

According to the preferred embodiment of the present invention, the rescue procedure is cardiopulmonary resuscitation.

According to the preferred embodiment of the present invention, a power supply is carried by the housing and a switch member is connected to the power supply for activating the pacing signal generator.

According to the preferred embodiment of the present invention, a disabling switch is provided for permanently deactivating the pacing signal generator.

Other objects, features, and advantages of the present invention will become apparent from the description and drawings, which follow.

DETAILED DESCRIPTION OF THE INVENTION

Figure 1:
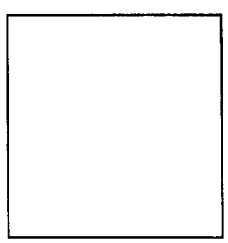
FIG. 1 is a plan view of the pacing apparatus according to the present invention in a folded or compact configuration.

Referring now to the figures, FIG. 1 depicts pacing apparatus 11 according to the present invention in a folded and compact configuration. Pacing apparatus 11 is square, preferably less than about one inch in thickness, and is about four and seven-eighths inch on a side when in the folded condition. This provides a compact unit that is relatively flat and suitable for storage in a first aid kit, in a drawer, or to be hung on a wall adjacent to or as part of a display concerning administration of CPR.

Figure 2A:
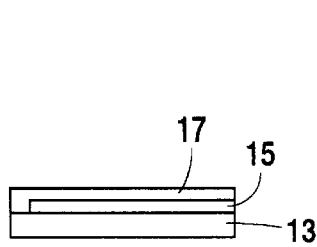
FIGS. 2A and 2B are end elevation views of the pacing apparatus of FIG. 1.
Figure 2B:
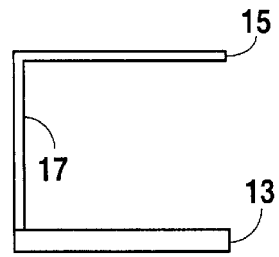

FIGS. 2A and 2B illustrate pacing apparatus 11 from its end in the folded condition and as it is being unfolded, respectively. Pacing apparatus includes a housing comprising a base member 13 and a pair of flaps 15, 17 that are connected by self-formed hinges to one another and to base member 13. Flaps 15, 17 are of the same square dimension as is base member 13.

Figure 3A:
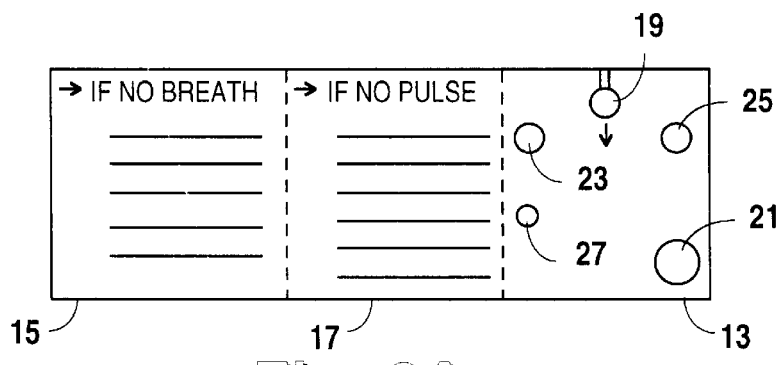
FIGS. 3A and 3B are plan views of opposite sides of the pacing apparatus of FIG. 1 in an unfolded or operating condition.
Figure 3B:
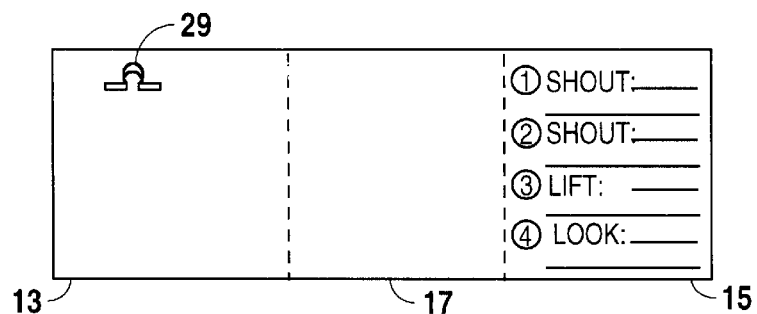

FIGS. 3A and 3B are plan views of opposite sides of pacing apparatus 11 illustrating the presence of visual indicia, in the form of textual or written instructions and graphic illustrations, of the steps of CPR. On the first panel, on the outside of flap 15, the following instructions are printed:

1) SHOUT: "Are you OK?"
2) SHOUT: "Call for help—call 911"
3) LIFT chin and TILT head back.
4) LOOK for chest movement, LISTEN for breath sounds, FEEL for breath on your cheeks! IF NO BREATH . . . →

On the second panel, on the inside of flap 15, the following text appears:

→IF NO BREATH . . .
Pinch nostrils closed. Give 2 slow breaths. Watch for chest to rise.
Check neck for pulse. If present, give 1 breath every 5 seconds.

On the third panel, on the inside of flap 17 the following is printed:

→IF NO PULSE . . .
Find the lower ⅓ of the breast bone. Follow the audible rhythm of the Pacer:
Press down 15 times.
Give 2 breaths.
Repeat, repeat, repeat, repeat.
Check for pulse every 4 cycles.

The foregoing text is accompanied by illustrations of the techniques described and represents the American Heart Association recommendations for administration of CPR for an adult. The guidelines for children are similar, but call for only five compressions between single artificial respiration breaths.

In addition to the foregoing visual indicia, the inside of base member 13 is provided with a pacing means, or pacing signal generator, which includes an activation switch 19, an audible tone generator in the form of a speaker 21, two flashing light-emitting diodes (LEDs) 23, 25, and a disabling switch 27. A hanging means, such as a loop or bracket 29, may be provided on the outside of base member 13 to permit pacing apparatus to be hung from a wall in a convenient location.

Activation switch member 19 is a pull tab or ring and is labeled "pull out to activate." This starts a green LED 23, labeled "give breaths when this light is flashing", flashing at the rate of about 12 times per minute or every five seconds. Activation switch 19 also starts a red LED 25, labeled "press on chest while this light is flashing", flashing at the rate of 60 times per minute or once a second. A one-second pause is provided before and after breath signals (tone and red LED) are provided to permit setup for artificial respiration. Speaker 21 delivers a tone of one selected frequency in synchronization with the flashing of LED 23 and a second tone of a second selected frequency in synchronization with the flashing of LED 25. Thus, pacing apparatus 11 provides both instructions and audio-visual prompting tones or pacing signals to a person or persons administering CPR to a patient. These instructions, pacing tones, and signals are for a normal adult ages 12 and up. The apparatus may also be configured for pacing administration of CPR to a child. The housing should be clearly marked "ADULT" or "CHILD" to distinguish them.

Figure 4:
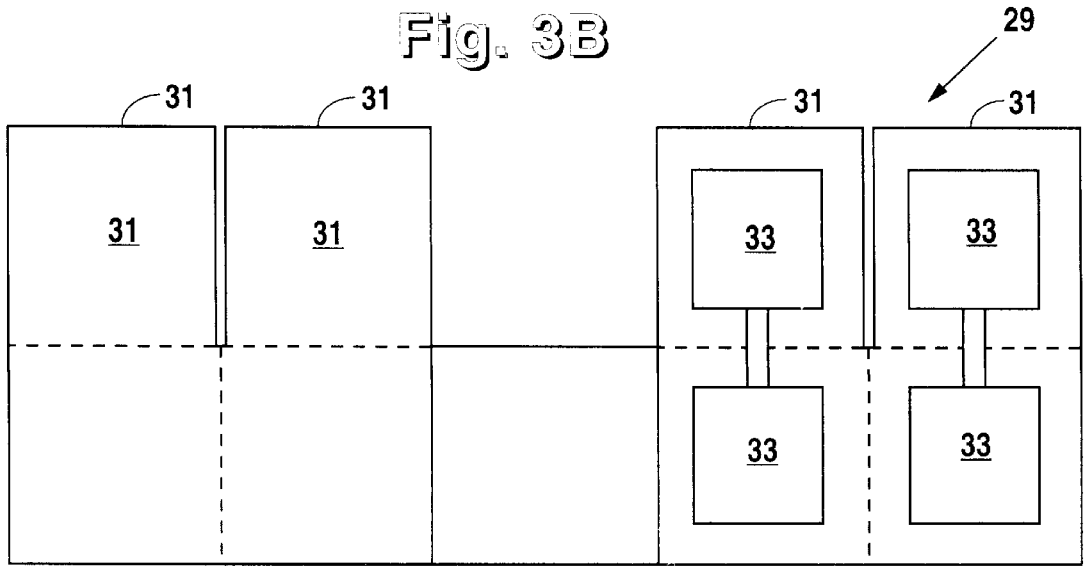
FIG. 4 illustrates the cardboard blank from which the pacing apparatus according to the present invention is formed.

Pacing apparatus 11 is designed to be low-cost and disposable. Accordingly, the housing comprising base member 13 and flaps 15, 17 is formed of corrugated paper cardboard. The die-cut blank 29 from which the housing is manufactured is illustrated in FIG. 4. As illustrated, blank 29 is rectangular and about five times the width of apparatus 11 in the folded condition (about 25 inches) and twice the height of apparatus 11 in the folded condition (about ten inches). Four fold-over flaps 31 are cut and are folded over and secured to the remainder of blank 29 using adhesive to form flaps 15, 17 of the housing and to lend flaps 15, 17 some extra rigidity. Two of the flaps 31 on the ends are folded over on one another and over the middle flap 31 and secured to form base member 13. A central portion 33 of each of these two flaps 31 (and the corresponding fold-over portions) is cut out to provide a space for the electronic components (see FIG. 5) of the pacing signal generator carried in base member 13 of the housing. The remaining single thickness of cardboard provides the hinges between base member 13 and flaps 15, 17.

Figure 5:
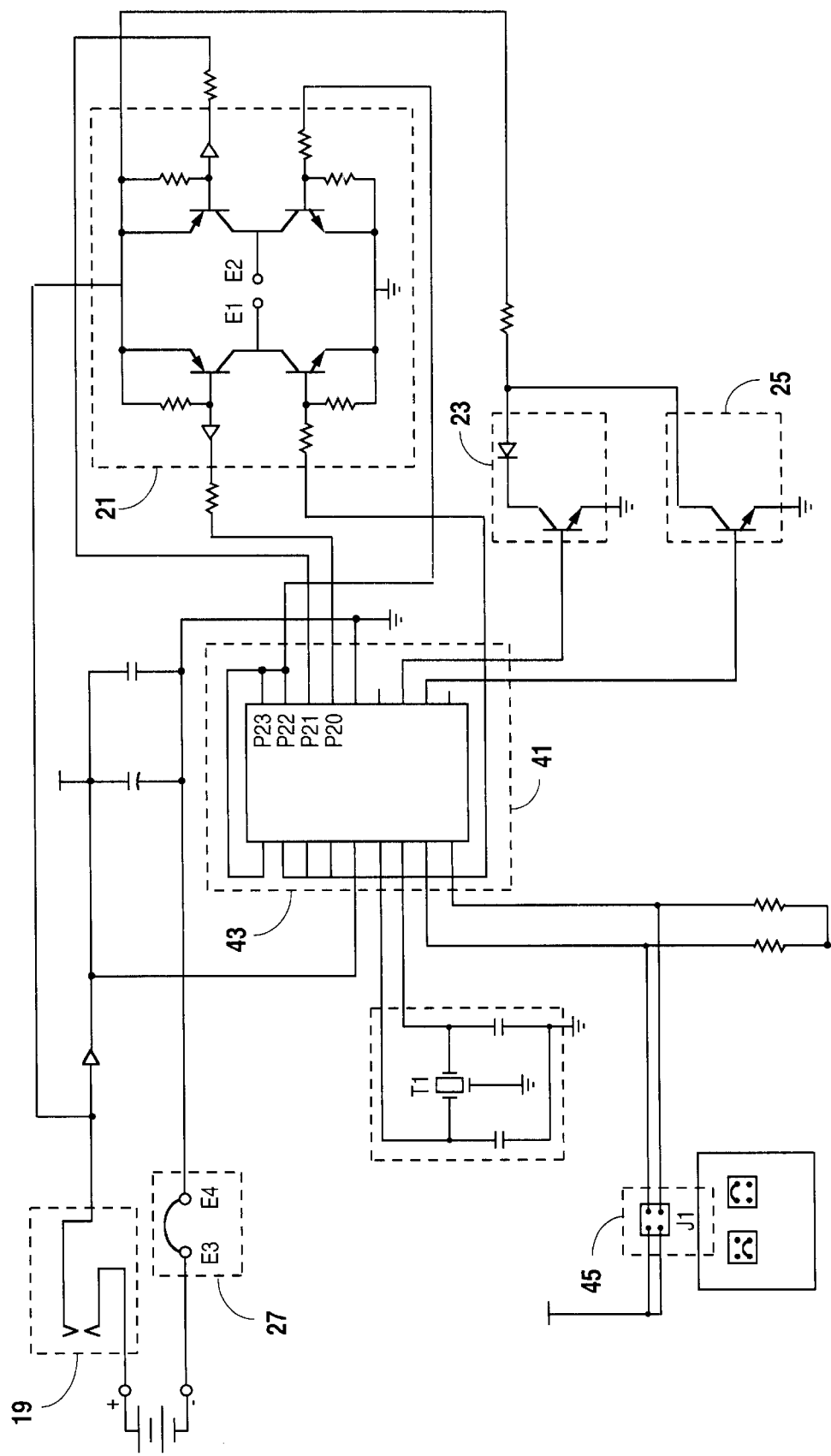
FIG. 5 is an electrical schematic of the electronic portion of the pacing apparatus according to the present invention.

FIG. 5 is an electrical schematic of the electronic portion of the pacing apparatus according to the present invention. A six volt battery is provided in series with a one-time activation switch 19 to provide power to the remainder of the circuit. Power from the battery is provided to a microprocessor 41, preferably a Zilog Z-8 microcontroller, that is programmed to provide appropriate output signals to a piezoelectic speaker 21 and LEDs 23, 25 to permit them to provide audible and visual pacing tones and signals as previously described. A clock 43 is coupled to processor 41 to provide a timing signal by which the timing of pacing tones or signals is calculated by processor 41 to provide accurate pacing. A jumper switch 45 is also coupled to processor 41 to permit the manufacturer or vendor to easily select between "ADULT" and "CHILD" pacing signal timing, simply by changing the position of a conventional jumper. Finally, the previously described disabling switch 27 is provided in series with the battery and the remainder of the circuit to permanently disable the pacing tones and signals. The foregoing circuit may be implemented using printed circuit board and surface-mount technology. For production purposes, virtually all electronic components external to processor 41 except the battery, LEDs 23, 25, switches 19, 27, and speaker 21 can be formed in an application-specific integrated circuit (ASIC).

In operation, the user reviews the visual indicia provided on the housing to refresh his or her memory or for instruction in the administration of CPR. When the user is prepared to begin, the activation switch 19 is pulled or actuated to begin delivery of the pacing tones and signals. Following the instructions given on the housing and with pacing provided by tones from speaker 21 and LEDs 23, 25, the user administers the procedure. Upon completion of administration of the procedure, disabling switch 27 is triggered and apparatus 11 disposed of appropriately.

The present invention has several advantages. It provides a low-cost, single-use, disposable rescue aid that can be placed in an area where it is likely to be useful. The apparatus can be easily and inexpensively replaced.

The invention has been described with reference to the preferred embodiment. It is thus not limited, but is susceptible to variation and modification without departing from the scope and the spirit of the invention.

We claim:

1. An apparatus for providing a pacing signal for administration of a rescue procedure to a patient comprising:
   a housing of less than about 1" in thickness formed of laminar material;
   a power supply carried by the housing;
   visual indicia applied to the housing and providing instructions for the administration of the rescue procedure;
   a pacing signal generator carried by the housing for providing the pacing signal to a user;
   a switch member carried by the housing and connected to the power supply for activating the pacing signal generator, and
   a disabling switch for permanently deactivating the pacing signal generator.

2. The apparatus according to claim 1, wherein the laminar material is cardboard.

3. The apparatus according to claim 1, wherein the laminar material comprises:
   a plurality of rectilinear panels connected along their edges to permit folding of the laminar material to a reduced dimension.

4. The apparatus according to claim 1 wherein the pacing signal generator includes:
   an audible tone generator; and
   a flashing light-emitting diode.

5. The apparatus according to claim 1, wherein the visual indicia comprises words and graphic illustrations describing the rescue procedure.

6. The apparatus according to claim 5, wherein the rescue procedure is cardiopulmonary resuscitation.

7. An apparatus for pacing the administration of cardiopulmonary resuscitation comprising:
   a laminar housing including a base member and at least one flap, the flap being connected to and selectively foldable over the base member to permit folding of the housing to a reduced dimension;
   a signal generator carried by the housing for provision of at least one pacing signal;
   visual indicia applied to the housing for instructing a user in the administration of cardiopulmonary resuscitation, including chest compressions and artificial respirations;
   a power supply carried by the housing;
   a switch for activating the signal generator; and
   a disabling switch for permanently deactivating the rescue signal generator.

8. The apparatus according to claim 7, wherein the housing further comprises:
   a second flap coupled to the first flap both flaps being foldable over one another and the housing.

9. The apparatus according to claim 8, wherein the signal generator provides an audible pacing tone.

10. The apparatus according to claim 9, wherein the pacing signal includes a first selected tone of a first selected frequency, the first selected frequency being indicative of the frequency of administration of the chest compressions.

11. The apparatus according to claim 10, wherein the signal generator further provides:
    a second selected tone of a second selected frequency, the second selected frequency being indicative of the frequency of administration of the artificial respirations.

12. The apparatus according to claim 11, wherein the visual indicia comprises words and graphic illustrations.

13. The apparatus according to claim 10, wherein the pacing signal further includes at least one flashing light-emitting diode synchronized with the first selected tone.

14. The apparatus according to claim 13, wherein the flashing light-emitting diode comprises:
    a first light-emitting diode being alternately illuminated and turned off at the first frequency, the first light-emitting diode also being indicative of the frequency of administration of the chest compressions set forth in the visual indicia; and
    a second light-emitting diode being alternately illuminated and turned off at the second frequency, the second light-emitting diode also being indicative of the frequency of administration of the artificial respirations set forth in the visual indicia.

15. The apparatus according to claim 14, wherein the first light-emitting diode is green and the second light-emitting diode is red.

16. The apparatus according to claim 7, wherein the switch member is a single-use, pull-tab switch which can only activate the signal generator a single time.

17. The apparatus according to claim 7, wherein the disabling switch comprises a conductive wire stretched across an aperture in the housing, wherein the wire can be broken.

18. The apparatus according to claim 7, wherein the housing further comprises a hanging means for hanging the apparatus.

19. A single-use, portable apparatus for pacing the rate of administration of cardiopulmonary resuscitation comprising:
    a folded housing including a base member and at least one flap hinged to said base member and foldable over the base member;
    visual indicia on the housing for instructing a user in the administration of cardiopulmonary resuscitation, the cardiopulmonary resuscitation including chest compressions and artificial respirations;
    a user-detectable pacing means carried by the housing for producing at least one audible output signal at a selected tone and a selected frequency, and at least one light flashing on and off at a selected frequency;
    a switch for activating the pacing means;
    a power supply carried by the housing and coupled to the pacing means for supplying power to the pacing means; and
    a disabling switch for permanently deactivating the pacing means;
    wherein the apparatus provides audio-visual instructions and pacing to the user for administering cardiopulmonary resuscitation when said pacing means has been activated and the at least one flap is not folded over said base member.

20. A method of administering a rescue procedure utilizing a rescue procedure pacing device comprising the steps of:
    providing a rescue procedure pacing device having at least one pacing signal, written rescue procedures, at least one flap, and a base member;
    positioning the pacing device in a location in which said written rescue procedures can be read;
    activating the rescue procedure pacing device;
    administering the rescue procedure according to the written rescue procedures and pacing signal provided by the pacing device;

permanently deactivating the rescue procedure pacing device after completion of the rescue procedure.

21. The method according to claim 20, wherein the positioning step is accomplished by separating at least one folded flap of the housing from the base member to reveal the written rescue procedures.

22. The method according to claim 20, wherein the activation step is accomplished by pulling a single-use, pull-tab switch on the rescue procedure pacing device.

23. The method according to claim 20, wherein the administration step occurs at a pace indicated by the written instructions and pacing signal.

24. The method according to claim 20, wherein the step of permanently deactivating is performed by piercing the housing of the rescue procedure pacing device, thereby permanently severing a circuit-breaker.

* * * * *